(12) United States Patent
Chen et al.

(10) Patent No.: US 6,700,370 B2
(45) Date of Patent: Mar. 2, 2004

(54) APPARATUS FOR MEASURING THE THICKNESS OF A THIN FILM HAVING EDDY CURRENT COIL SENSOR

(75) Inventors: Kai Chen, Kanagawa (JP); Shizuo Nakamura, Kanagawa (JP); Akihito Minamitsu, Kanagawa (JP)

(73) Assignee: ULVAC, Inc., Chigasaki (JP)

( * ) Notice: Subject to any disclaimer, the term of this patent is extended or adjusted under 35 U.S.C. 154(b) by 0 days.

(21) Appl. No.: 09/985,526

(22) Filed: Nov. 5, 2001

(65) Prior Publication Data

US 2002/0053904 A1 May 9, 2002

(30) Foreign Application Priority Data

Nov. 8, 2000 (JP) ......................... 2000-340066

(51) Int. Cl.⁷ ................................. G01B 7/06
(52) U.S. Cl. ....................... 324/230; 324/226
(58) Field of Search ................. 324/230, 231, 324/229, 226, 227

(56) References Cited

U.S. PATENT DOCUMENTS

| | | | |
|---|---|---|---|
| 4,849,694 A | * 7/1989 | Coates | ......................... 324/230 |
| 5,355,083 A | * 10/1994 | George et al. | ............... 324/229 |
| 5,525,903 A | 6/1996 | Mandl et al. | |
| 5,660,672 A | 8/1997 | Li et al. | |
| 6,549,006 B2 | * 4/2003 | Le | .............................. 324/230 |
| 6,563,308 B2 | * 5/2003 | Nagano et al. | .............. 324/230 |

* cited by examiner

Primary Examiner—Walter E. Snow
(74) Attorney, Agent, or Firm—Armstrong, Ktrazt, Quintos, Hanson & Brooks, LLP.

(57) ABSTRACT

The thickness of a conductive film formed on a substrate can be measured efficiently at low cost with a film thickness measuring apparatus of the invention, which includes an eddy current coil sensor, disposable at a predetermined position near a conductive film, for generating a predetermined eddy current in the conductive film and for detecting a magnetic field caused by the eddy current. The apparatus also includes a displacement sensor for measuring a displacement between the eddy current coil sensor and the conductive film. The thickness of the conductive film is measured in accordance with a variation in inductance of the eddy current coil sensor and the amount of displacement measured by the displacement sensor.

12 Claims, 4 Drawing Sheets

APPARATUS FOR MEASURING THE THICKNESS OF A THIN FILM HAVING EDDY CURRENT COIL SENSOR

BACKGROUND OF THE INVENTION

1. Field of the Invention

The present invention relates to a method and apparatus for allowing non-contact non-destructive inspection of the deposition state of a conductive thin film formed, for example, on a semiconductor substrate or a glass substrate.

2. Description of the Related Art

These days, in the technical field of semiconductors, electron or optical devices have employed silicon wafers having conductive thin films formed thereon, for example, by sputtering, CVD, or plating.

For such devices, it is important to produce as many devices of the same quality as possible. To this end, it is required to thoroughly control the thickness and electrical properties of the thin films formed on the substrate.

Conventionally known is a method comprising the following steps. First, a number of substrates coated with a conductive film are prepared in one batch at the same time. Then, the film of one of the substrates is destroyed to inspect and analyze the thickness and the electrical properties thereof using a technique such as the four probe measurement or a stylus profiler. Thus, the results of the analysis are adopted as a typical value to estimate the quality of the substrates.

However, this method presents a problem in that some defective substrates cannot be found even when those substrates do not satisfy the predetermined quality.

On the other hand, also known are methods for allowing the non-contact measurement of the thickness of films formed on the substrate. For example, the methods include the X-ray interference method or the laser excitation method.

However, these methods provide very slow measurement speeds at too high a cost; and thereby, cannot be used for mass production.

SUMMARY OF THE INVENTION

The present invention was developed to solve such conventional technical problems as described above. It is therefore an object of the present invention to provide a technique which is capable of measuring the thickness of conductive thin films, formed on a substrate, efficiently at low costs.

In order to attain the object, in a first aspect, the present invention provides a film thickness measuring apparatus comprising an eddy current coil sensor, disposing at a predetermined position near a film to be measured, for generating a predetermined eddy current in the film and for detecting a magnetic field caused by the eddy current, and a displacement sensor for measuring a displacement between the eddy current coil sensor and the film to be measured, wherein a thickness of the film is measured in accordance with a variation in inductance of the eddy current coil sensor and the amount of displacement measured by the displacement sensor.

The film thickness measuring apparatus according to a second aspect of the invention, wherein the thickness of the film is measured with a constant relative distance being maintained between the film and the eddy current coil sensor.

The film thickness measuring apparatus according to a third aspect of the invention, wherein a portion of the film to be measured where the eddy current coil sensor generates an eddy current and a portion of the film to be measured where the displacement sensor measures a displacement coincide with each other.

The film thickness measuring apparatus according to a fourth aspect of the invention, wherein the displacement sensor is a laser displacement sensor for emitting a laser beam to the film to be measured to thereby measure a displacement.

The film thickness measuring apparatus according to a fifth aspect of the invention, wherein the displacement sensor is an electrostatic capacitance displacement sensor for detecting an electrostatic capacitance between the displacement sensor and the film to be measured to thereby measure a displacement.

The film thickness measuring apparatus according to a sixth aspect of the invention, wherein the laser beam emitted from the laser displacement sensor penetrates the eddy current coil sensor.

The film thickness measuring apparatus according to a seventh aspect of the invention, wherein the eddy current coil sensor and the electrostatic capacitance displacement sensor are disposed in a coaxial relation to each other.

The present invention provides, in an eighth aspect, a film thickness measuring apparatus comprising an eddy current coil sensor, disposing at a predetermined position near a film to be measured, for generating a predetermined eddy current in the film and for detecting a magnetic field caused by the eddy current; a displacement sensor for measuring a displacement between the eddy current coil sensor and the film to be measured; and a movement mechanism for adjusting an amount of a relative displacement between the eddy current coil sensor and the film. A thickness of the film is measured in accordance with a variation in inductance of the eddy current coil sensor and the amount of displacement measured by the displacement sensor.

The film thickness measuring apparatus according to a ninth aspect of the invention, wherein the thickness of the film is measured with a constant relative distance being maintained between the film and the eddy current coil sensor.

The film thickness measuring apparatus according to a tenth aspect of the invention, wherein a portion of the film to be measured where the eddy current coil sensor generates an eddy current and a portion of the film to be measured where the displacement sensor measures a displacement coincide with each other.

The film thickness measuring apparatus according to an eleventh aspect of the invention, wherein the displacement sensor is a laser displacement sensor for emitting a laser beam to the film to be measured to thereby measure a displacement.

The film thickness measuring apparatus according to a twelfth aspect of the invention, wherein the displacement sensor is an electrostatic capacitance displacement sensor for detecting an electrostatic capacitance between the displacement sensor and the film to be measured to thereby measure a displacement.

In the film thickness measuring apparatus according to a thirteenth aspect of the invention, the laser beam emitted from the laser displacement sensor penetrates the eddy current coil sensor.

In the film thickness measuring apparatus according to fourteenth aspect of the invention, the eddy current coil sensor and the electrostatic capacitance displacement sensor are disposed in a coaxial relation to each other.

This invention is adapted to measure the thickness of a film to be measured in accordance with a variation in inductance of the eddy current coil sensor and the amount of displacement measured by the displacement sensor. This makes it possible to measure the thickness of a film more quickly than by the prior-art non-contact film thickness measuring apparatus.

The present invention makes it also possible to measure the film thickness at low cost in a simple configuration.

According to this invention, the relative distance between the eddy current coil sensor and the film to be measured can be maintained at a constant value. This makes it possible to measure a variation in inductance of the eddy current coil sensor always under the same condition. Consequently, it is possible to measure the thickness of a film with better accuracy.

As this invention, it is possible to measure the thickness of a film always under the same condition. Consequently, quick film thickness measurement with better accuracy can be accomplished when measuring a thickness of a film using the film thickness measuring apparatus according this invention; and the thickness of the film is measured with a constant relative distance being maintained between the film to be measured and the eddy current coil sensor.

According to this invention, after measuring the displacement, the thickness of the film to be measured can be measured at a predetermined portion without moving the film thickness measuring apparatus relative to the film to be measured. This makes it possible to measure the film thickness more quickly.

According to this invention, since the laser displacement sensor is employed, distances can be measured with high spatial resolution and high accuracy.

According to this invention, it is possible to easily coincide the portion of the film to be measured where the eddy current coil sensor generates an eddy current with the portion of the film to be measured where the laser displacement sensor measures a displacement.

According to this invention, since the electrostatic capacitance sensor is employed, it is possible to arrange the eddy current sensor and the electrostatic capacitance sensor in a coaxial relation to each other and provide a compact easily-attachable film-thickness measuring apparatus.

According to this invention, it is possible to easily coincide the portion of the film to be measured where the eddy current coil sensor generates an eddy current with the portion of the film to be measured where the electrostatic capacitance displacement sensor measures a displacement.

BRIEF DESCRIPTION OF THE DRAWINGS

The above and other objects, features and advantages of the present invention will be apparent from the following detailed description of the preferred embodiments of the invention in conjunction with the accompanying drawings, in which:

FIGS. 7(*a*) to 7(*d*) are views illustrating some components of an electrostatic capacitance displacement sensor according to the third embodiment.

DETAILED DESCRIPTION OF THE PREFERRED EMBODIMENTS

Now, a thin-film measuring apparatus according to the present invention is explained in detail below with reference to the accompanying drawings in accordance with the embodiments.

Figure 1:
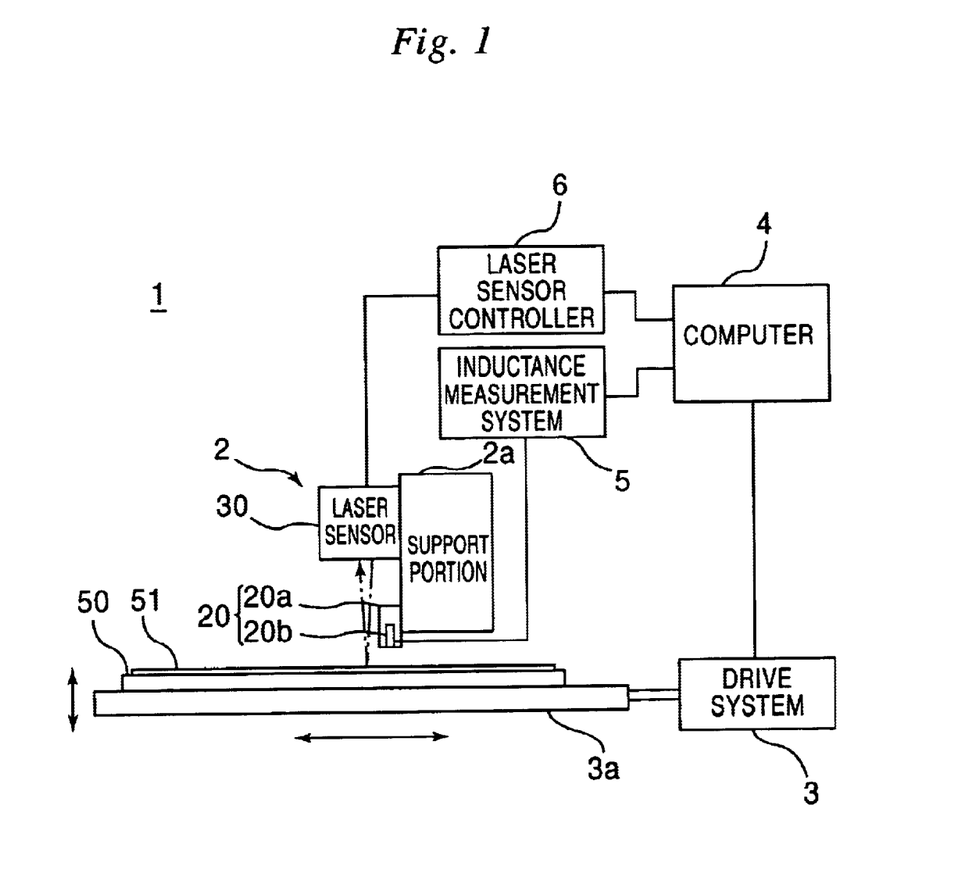
FIG. 1 is a schematic view illustrating the overall configuration of a first embodiment according to the present invention.

FIG. 1 is a schematic view illustrating the overall configuration of a first embodiment according to the present invention.

As shown in FIG. 1, for example, the film thickness measuring apparatus 1 according to this embodiment has a measuring portion 2 disposed above a substrate 50, such as a silicon wafer, supported on a substrate stage 3*a* which is driven by a drive system 3 (movement mechanism).

The drive system 3 is designed to operate in accordance with commands provided by a computer 4. The drive system 3 is also adapted to displace the substrate stage 3*a* vertically and horizontally, thereby changing the relative position between the measuring portion 2 and the substrate 50.

For example, the measuring portion 2 according to this embodiment is provided with a support portion 2*a* formed of an insulating material such as plastics. To this support portion 2*a*, attached are an eddy current coil sensor 20 (hereinafter referred to as the eddy current sensor) and a laser displacement sensor 30 (hereinafter referred to as the laser sensor).

In this configuration, the eddy current sensor 20 is disposed in the vicinity of the substrate 50 to be proximate to a conductive film 51 (a film to be measured) formed on the substrate 50.

For example, the eddy current sensor 20 has a main body portion 20*a* formed of an insulating material such as polyacetal resin. In the main body portion 20*a*, buried is a coil portion 20*b* comprising a measuring coil 11 and a reference coil 12, which are described later. In addition, the coil portion 20*b* is connected to an inductance measurement system 5.

Moreover, the laser sensor 30 is provided at a predetermined position above the eddy current sensor 20.

A laser sensor controller 6 controls the laser sensor 30, which irradiates a predetermined position (near the eddy current sensor 20 in this embodiment) on the conductive film 51 on the substrate 50 to thereby measure the distance between the laser sensor 30 and a surface of the conductive film 51 with high accuracy (e.g., within an error of about ±1 μm).

Furthermore, the inductance measurement system 5 and the laser sensor controller 6 are connected to the computer 4 to analyze data in the computer 4.

Figure 2:
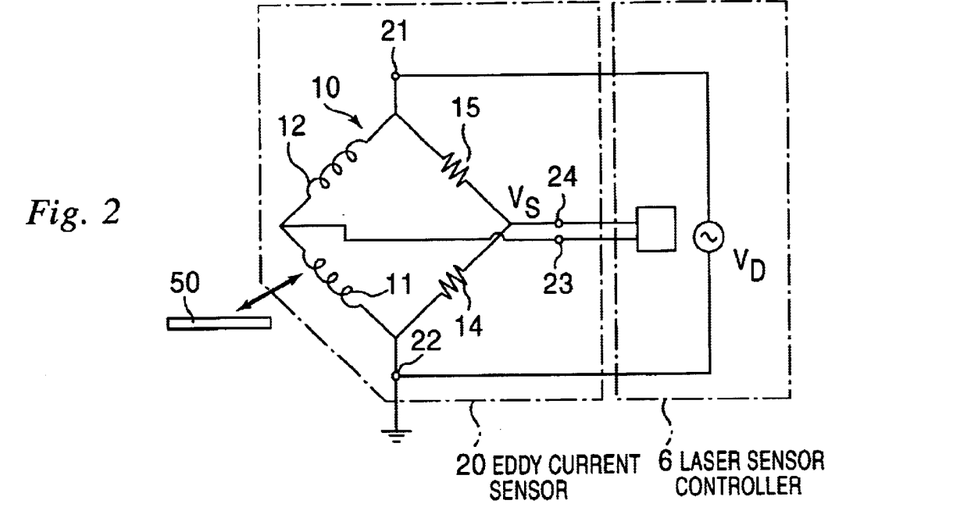
FIG. 2 is a circuit diagram illustrating the configuration of an eddy current sensor according to the first embodiment.
Figure 3:
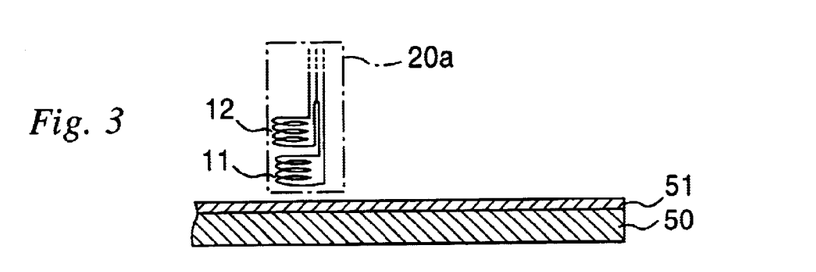
FIG. 3 is an explanatory view illustrating the relative positional relationship between the measuring coil and the reference coil of the eddy current sensor.

FIG. 2 is a circuit diagram illustrating the configuration of the eddy current sensor according to this embodiment. FIG. 3 is an explanatory view illustrating the relative positional relationship between the measuring coil and the reference coil of the eddy current sensor.

Now, the measurement principle of the present invention is explained below with reference to FIGS. 2 and 3.

Reference numeral 10 of FIG. 2 designates an inductance bridge which is referred to as the Maxwell bridge.

The inductance bridge 10 comprises the measuring coil 11, the reference coil 12, and first and second reference resistors 14, 15.

The measuring coil 11 and the reference coil 12 are connected in series to each other at an intermediate connecting point 23. Likewise, the first and second reference resistors 14, 15 are connected in series to each other at an intermediate connecting point 24.

The circuit having the measuring coil 11 and the reference coil 12 connected to each other in series and the circuit having the first and second reference resistors 14, 15 connected to each other in series are connected in parallel to each other at parallel connection points 21, 22 of both ends thereof.

Suppose the magnitude of the inductance component of the measuring coil 11 is made equal to that of the reference coil 12, and the first and second reference resistors 14, 15 are made equal in magnitude to each other. In this case, the balance of the inductance bridge 10 is achieved so that no voltage appears between the intermediate connecting points 23, 24 even when an alternating-current voltage $V_D$ is applied between the parallel connection points 21, 22.

Now, consider the case where the substrate 50 is brought closer to the measuring coil 11 with the balance of the inductance bridge 10 being achieved. In this case, an eddy current is generated inside the substrate 50 or in the conductive film 51 formed on the surface of the substrate 50. This eddy current causes the inductance component of the measuring coil 11 to vary in magnitude; thereby, resulting in an unbalanced inductance bridge 10. This causes an alternating-current voltage $V_S$ to appear between the intermediate connecting points 23, 24.

When the alternating-current voltage $V_D$ to be supplied to the inductance bridge 10 is expressed as $$V_D = V_{D0} \cdot \exp(i\omega t),$$

then, the alternating-current voltage $V_S$ which appears between the intermediate connecting points 23, 24 is expressed as follows. That is, $$V_S = V_{S0} \cdot \exp(\omega t + \phi) = V_{S0} \cdot \exp(i\omega t) \cdot \cos(\phi) + i \cdot V_{S0} \cdot \exp(i\omega t) \cdot \sin(\phi)$$

Among the alternating-current voltages $V_S$ appearing between the intermediate connecting points 23, 24, a voltage in phase with the alternating-current voltage $V_D$ applied and a voltage out of phase therewith by 90 degrees are determined. The ratio between the voltages makes it possible to determine a variation in magnitude of the inductance component of the measuring coil 11 caused by the eddy current; that is, a variation ΔL in the inductance component of the measuring coil 11.

The variation ΔL in the inductance component corresponds to an eddy current loss in the substrate 50; and the frequency of the alternating-current voltage $V_D$ is known. Accordingly, if the resistivity of the substrate 50 and the conductive film 51 (e.g., a copper thin film) formed on the surface of the substrate 50 is known, the thickness of the film can be determined.

In general, for the substrate 50 having an insulating main body, an eddy current occurs only in the conductive film 51.

On the other hand, even for the substrate 50 having a semiconductor main body, the conductivity of the substrate 50 is lower than that of the conductive film 51 so that the eddy current generated in the semiconductor substrate can be ignored. Accordingly, the variation ΔL in the inductance component can be regarded as resulting from the eddy current generated in the conductive film 51.

However, the variation ΔL in the inductance component of the measuring coil 11 is highly dependent on a distance W between the measuring coil 11 and the conductive film 51 formed on the surface of the substrate 50 as well as the material of the conductive film 51.

In this context, a database is prepared for storing data that are obtained by measuring the distance W and the variation ΔL in the inductance component, associated with each other, for the conductive film 51 having a known thickness D.

Then, the substrate 50 having an unknown thickness D is brought closer to the measuring coil 11 to measure the distance W between the measuring coil 11 and the conductive film 51 formed on the surface of the substrate 50 using an high-accuracy displacement sensor. In accordance with the aforementioned method, the variation ΔL in the inductance component is measured; and the resulting data is collated with data stored in the aforementioned database; thereby, making it possible to determine the unknown thickness D.

However, this can be done under the condition that the conductive film 51 used upon preparing the database and the conductive film 51 having the unknown thickness D are the same in material or conductivity.

Incidentally, to obtain a database in practice, a plurality of substrates 50 having conductive films 51 of different thicknesses are prepared first and then the thickness D of the conductive film 51 formed on each substrate 50 is measured using a stylus thickness measuring apparatus or the like. Then, after the distance W is varied to measure a variation ΔL in inductance component of each substrate 50, the measurements of the thickness D, the distance W, and the variation ΔL are stored as storage data in a storage device. Accordingly, the database can be obtained.

To measure the thickness in accordance with this embodiment, the substrate 50 on which the conductive film 51 to be measured is formed is carried on the substrate stage 3a and thereby placed under the measuring portion 2.

Subsequently, the laser sensor 30 emits a laser beam and the substrate 50 is moved such that the spot of the laser beam comes to the predetermined film thickness measuring portion on the conductive film 51 in order to measure the distance to the conductive film 51 using the laser sensor 30.

The resulting measured value is converted into the distance (the amount of displacement) between the measuring coil 11 of the eddy current sensor 20 and the conductive film 51. Then, this amount of displacement is compared with the value having been stored in the computer 4, and the substrate stage 3a is driven to move the substrate 50 vertically so that the difference therebetween becomes zero.

Subsequently, the substrate 50 is moved in the horizontal direction such that the eddy current sensor 20 comes to the aforementioned film thickness measuring portion, and then the eddy current sensor 20 is operated to generate an eddy current at this film thickness measuring portion. Then, the inductance measurement system 5 measures the inductance of the measuring coil 11. The resulting measured value is converted into a variation ΔL in inductance component of the measuring coil 11 in accordance with the aforementioned principle and the resulting value is then stored in the computer 4.

Then, using the variation ΔL in the inductance component of the measuring coil 11 and the distance between the measuring coil 11 and the conductive film 51, the thickness of the conductive film 51 at the portion is calculate d in accordance with the predetermined database having data concerning their correlations.

Thereafter, the substrate stage 3a is driven to move the substrate 50 in the horizontal direction so that the measuring portion 2 comes to the next measuring portion. Then, in accordance with the aforementioned method, the thickness of the conductive film 51 is measured at this position. Then, the same operation is repeated to thereby measure the thickness of a plurality of portions of the conductive film 51.

As described above, this embodiment is adapted to measure a variation in inductance of the measuring coil 11 of the eddy current sensor 20 and the thickness of the conductive film 51 in accordance with the amount of displacement measured by the laser sensor 30. Accordingly, the thickness of a film can be measured according to this embodiment more quickly than by a prior-art non-contact thickness measuring apparatus.

In addition, this embodiment provides the apparatus with a simple configuration and makes it possible to measure the thickness of a film at low cost.

Furthermore, this embodiment always maintains the relative distance between the eddy current sensor 20 and the conductive film 51 at a constant value. This makes it possible to measure a variation in inductance of the eddy current sensor 20 always under the same condition; thereby, allowing thickness measurement with better accuracy.

Figure 4:
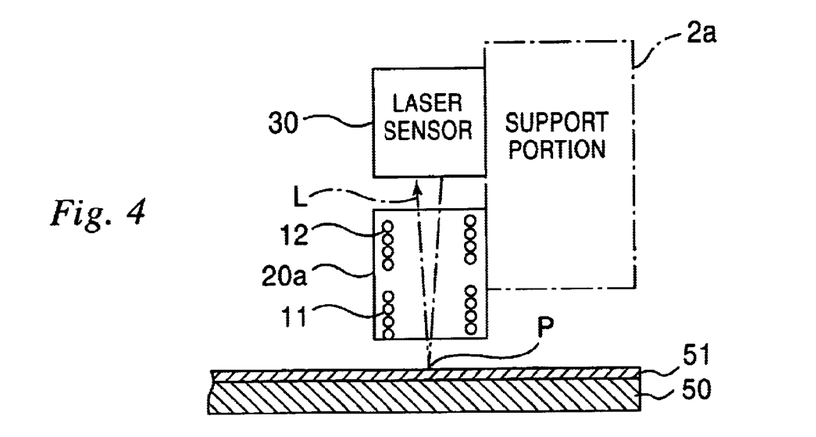
FIG. 4 is a schematic view illustrating the configuration of the main portion of a second embodiment according to the present invention.

FIG. 4 is a schematic view illustrating the configuration of the main portion of a second embodiment according to the present invention. The components corresponding to the aforementioned embodiment are given the same reference numerals and will not be repeated in detail below.

For example, as shown in FIG. 4, this embodiment has the main body portion 20a, formed in the shape of a cylinder, in which buried are the measuring coil 11 and the reference coil 12 of the eddy current sensor 20. In addition, the laser sensor 30 is located such that a laser beam L emitted from the laser sensor 30 penetrates the main body portion 20a of the eddy current sensor 20; that is, the measuring coil 11 and the reference coil 12.

Furthermore, this embodiment is adapted that the portion at which the eddy current sensor 20 generates an eddy current and the portion at which the laser sensor 30 measures the displacement thereof coincide with each other (indicated by reference symbol P in FIG. 4).

Suppose a predetermined portion of the conductive film 51 is measured according to this embodiment in such a configuration. In this case, the thickness of the film can be measured without moving the substrate 50 in the horizontal direction; thereby, making it possible to measure the thickness of a film more quickly. Other configurations, actions, and effects are the same as those of the aforementioned embodiment and thus not repeated in detail.

Figure 5:
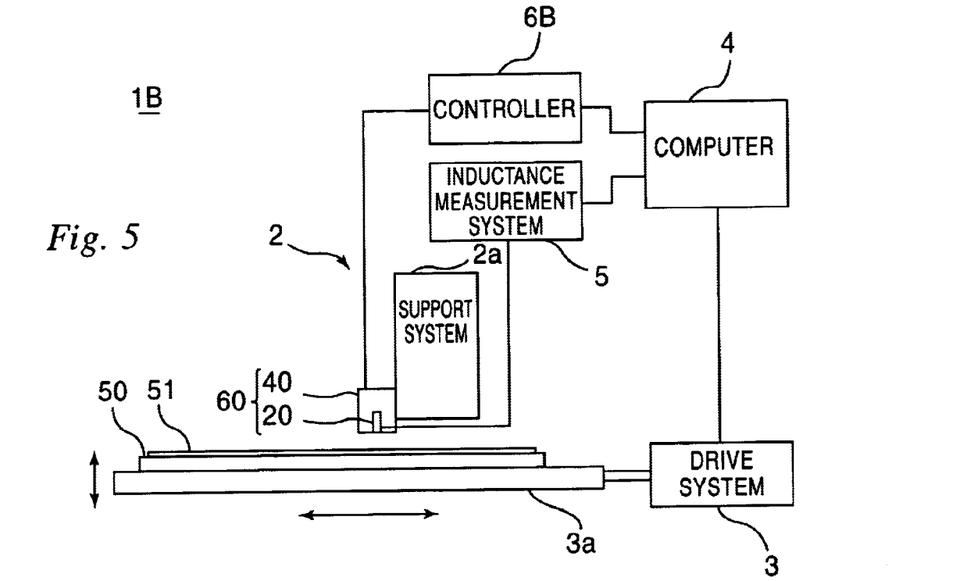
FIG. 5 schematic view illustrating the overall configuration of a third embodiment according to the present invention.
Figure 6:
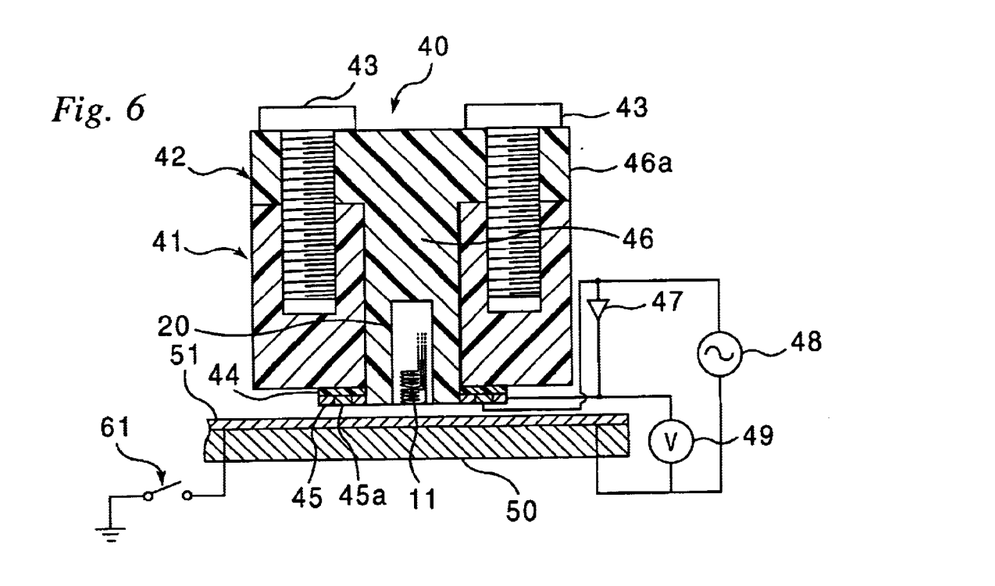
FIG. 6 is a view illustrating the configuration of the main portion of the third embodiment.

FIGS. 5 to 7 show a third embodiment according to the present invention. The components corresponding to the aforementioned embodiment are given the same reference numerals and will not be repeated in detail below.

Figure 7A:
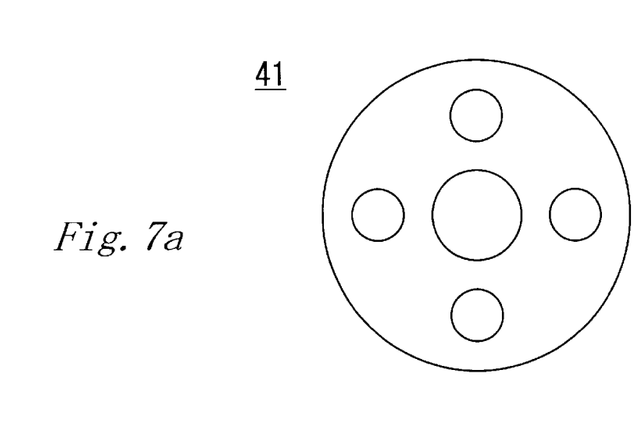
Figure 7B:
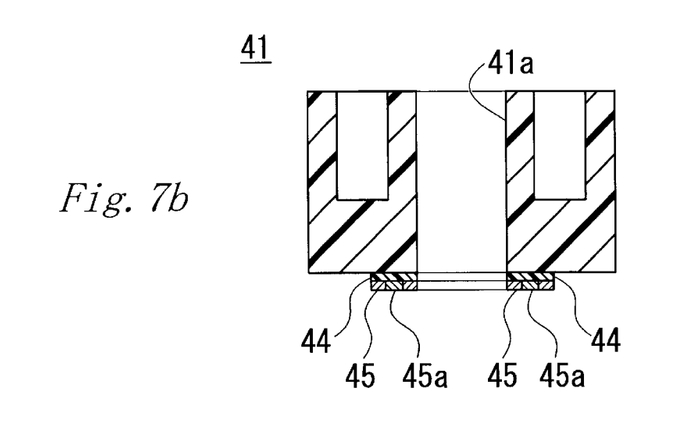
Figure 7C:
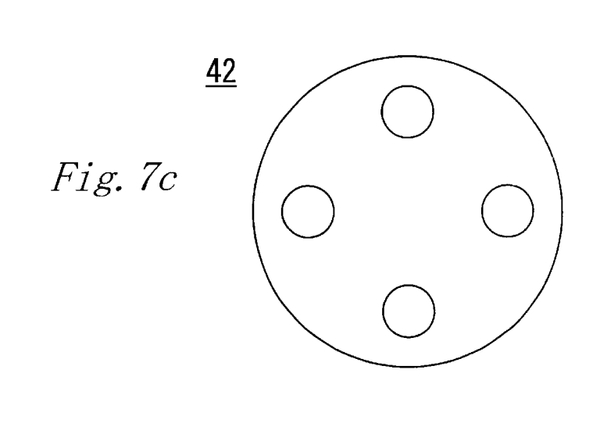
Figure 7D:
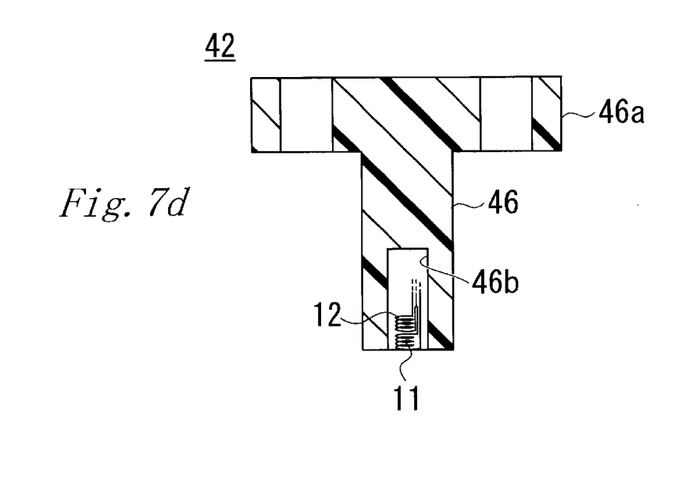

FIG. 5 is a schematic view illustrating the overall configuration of this embodiment. FIG. 6 is a view illustrating the configuration of the main portion of this embodiment. FIGS. 7(a) to (d) are views illustrating some of the components of an electrostatic capacitance displacement sensor according to this embodiment, where FIG. 7(a) is a plan view, FIG. 7(b) is a cross-sectional view, FIG. 7(c) is a plan view, and FIG. 7(d) is a cross-sectional view.

A film thickness measuring apparatus 1B according to this embodiment comprises, instead of the laser sensor 30 in the aforementioned embodiments, an electrostatic capacitance displacement sensor 40 (hereinafter referred to as the electrostatic capacitance sensor) which is controlled by a controller 6B.

As shown in FIGS. 5 and 6, for this embodiment, the detecting portion of the aforementioned eddy current sensor 20 and the electrostatic capacitance sensor 40 are integrated; and this sensor assembly 60 is mounted to the aforementioned support portion 2a.

As shown in FIG. 6 and FIGS. 7(a) to 7(d), the electrostatic capacitance sensor 40 according to this embodiment has first and second components 41, 42, which are fixedly integrated with, for example, a screw 43.

As shown in FIGS. 7(a) and 7(b), the first component 41 is a support portion for the probe of the electrostatic capacitance sensor 40. For example, the first component 41 is formed of an insulating material (such as, polyacetal resin) in the shape of a hollow cylinder and has an annular board 44 (e.g., formed of a glass epoxy resin) provided at a bottom portion thereof. The board 44 is also provided thereon with an annular guard electrode 45 and a center electrode 45a.

As shown in FIGS. 7(c) and 7(d), the second component 42 is a support portion for the coil of the eddy current sensor 20. For example, the second component 42 is formed of an insulating material (such as, a polyacetal resin) and has a projected portion 46 that fits in a hole portion 41a of the first component 41. The projected portion 46 is integrally provided with a disc-shaped flange portion 46a.

In addition, for example, there is formed a cylindrical hole portion 46b in the end portion of the projected portion 46 of the second component 42. The hole portion 46b is adapted to house therein the measuring coil 11 and the reference coil 12 of the aforementioned eddy current sensor 20.

In this case, the measuring coil 11 is disposed such that the end portion of the measuring coil 11 is flush with the end portion of the projected portion 46 in the hole portion 46b of the projected portion 46, and the center axis of the measuring coil 11 coincides with that of the projected portion 46. In addition, the measuring coil 11 and the reference coil 12 are fixedly adhered in the hole portion 46b by means of a non-conductive adhesive.

In this configuration, on the conductive film 51, the portion at which the measuring coil 11 generates an eddy current coincides with the portion where the electrostatic capacitance sensor 40 measures the displacement thereof.

As shown in FIG. 6, in the electrostatic capacitance sensor 40 according to this embodiment, the connection is established in a manner such that a constant alternating current is supplied to the conductive film 51 and the center electrode 45a from an alternating-current power supply 48. In addition, a constant alternating current is supplied to the guard electrode 45 from the alternating-current power supply 48 via a buffer 47 having a low output impedance so that the guard electrode 45 has the same potential as that of the center electrode 45a.

The electrostatic capacitance sensor 40 is further adapted such that a voltmeter 49 measures the voltage between the conductive film 51 and the guard electrode 45.

Incidentally, this embodiment is designed such that the conductive film 51 is grounded at a predetermined timing when connected to the ground via a switch 61.

To measure the thickness of a film according to this embodiment in such a configuration, the substrate 50 (on which the conductive film 51 to be measured is formed) is moved on the substrate stage 3a and thereby placed under the sensor assembly 60 of the measuring portion 2.

Then, the switch 61 is actuated to ground the conductive film 51.

Then, the alternating-current power supply 48 supplies a constant alternating current to the conductive film 51 and the center electrode 45a as well as to the guard electrode 45 via the buffer 47.

In the electrostatic capacitance sensor 40 according to this embodiment, since the guard electrode 45 and the center electrode 45a are at the same potential, a donut-shaped parallel plate capacitor is formed between the center electrode 45a and the conductive film 51.

Consequently, the voltage V measured by the voltmeter 49 is proportional to the distance g between the center electrode 45a and the conductive film 51 as shown by the following equation.

$$V=(I/\omega\epsilon_0 A)g,$$

where I is the value of current, $\omega$ is the angular frequency of the alternating-current power supply, $\epsilon_0$ is the dielectric constant of vacuum, and A is the area of the center electrode.

In accordance with the voltage V measured as described above, the distance between the measuring coil 11, which is flush with the end portion of the center electrode 45a, and the conductive film 51 is then measured. Subsequently, this distance is compared with the value having been stored in the computer 4, and the substrate stage 3a is driven to move the substrate 50 vertically so that the difference therebetween becomes zero.

At this time, the switch 61 is actuated to disconnect the conductive film 51 from the ground.

Then, the eddy current sensor 20 is operated at this position to generate an eddy current at the film thickness measuring portion on the conductive film 51; thereby, measuring a variation in inductance of the measuring coil 11 using the inductance measurement system 5.

Then, the same steps as those of the aforementioned embodiments are carried out to calculate the thickness of the portion of the conductive film 51.

As described above, like the aforementioned embodiments, this embodiment makes it possible to perform the measurement of a film thickness more quickly than by the conventional non-contact thickness measuring apparatus and at low cost in a simple configuration.

In particular, for measurement of the thickness of the conductive film 51 at a predetermined portion thereof, this embodiment can carry out the measurement of the film thickness without moving the substrate 50 in the horizontal direction. Accordingly, it is possible to measure the film thickness more quickly.

Furthermore, since the electrostatic capacitance sensor 40 is employed, this embodiment makes it possible to arrange the eddy current sensor 20 and the electrostatic capacitance sensor 40 in a coaxial relation to each other and provide a compact easily-attachable film-thickness measuring apparatus. Other configurations, actions, and effects are the same as those of the aforementioned embodiments and thus not repeatedly explained in detail.

Incidentally, the present invention is not limited to the aforementioned embodiments and various modifications can be made.

For example, the aforementioned embodiments allow the substrate to move vertically and horizontally, thereby changing the position for measuring a film thickness. However, the present invention is not limited thereto and can also be adapted to move the measuring portion of the film thickness measuring apparatus.

On the other hand, the aforementioned embodiments are adapted to maintain a constant relative distance between the eddy current coil sensor and the conductive film upon measuring the film thickness using the eddy current coil sensor. However, it is also possible to measure the film thickness in accordance with a predetermined database without changing the relative distance between the eddy current coil sensor and the conductive film.

Furthermore, for example, the present invention is also applicable to apparatuses for performing various processing (such as, a metal film deposition apparatus or a CMP apparatus), as well as to various substrates (such as, silicon wafers or glass substrates).

As described above, the present invention makes it possible to measure the thickness of a conductive thin film formed on a substrate efficiently and at low cost.

While there has been described what are at present considered to be preferred embodiments of the invention, it will be understood that various modifications may be made thereto, and it is intended that the appended claims cover all such modification as fall within the true spirit and scope of the invention.

What is claimed is:

1. A film thickness measuring apparatus comprising
   an eddy current coil sensor, disposing at a predetermined position near a film to be measured, for generating a predetermined eddy current in the film and for detecting a magnetic field caused by the eddy current, and
   a displacement sensor for measuring a displacement between the eddy current coil sensor and the film to be measured,
   wherein a thickness of the film is measured in accordance with a variation in inductance of the eddy current coil sensor and the amount of displacement measured by the displacement sensor, and
   wherein the displacement sensor is a laser displacement sensor for emitting a laser beam to the film to be measured to thereby measure a displacement, the laser displacement sensor being mounted above the eddy current coil sensor.

2. The film thickness measuring apparatus according to claim 1, wherein the thickness of the film is measured with a constant relative distance being maintained between the film and the eddy current coil sensor.

3. The film thickness measuring apparatus according to claim 1, wherein a portion of the film to be measured where the eddy current coil sensor generates an eddy current and a portion of the film to be measured where the displacement sensor measures a displacement coincide with each other.

4. The film thickness measuring apparatus comprising
   an eddy current coil sensor, disposing at a predetermined position near a film to be measured, for generating a predetermined eddy current in the film and for detecting a magnetic field caused by the eddy current, and
   a displacement sensor for measuring a displacement between the eddy current coil sensor and the film to be measured,
   wherein a thickness of the film is measured in accordance with a variation in inductance of the eddy current coil sensor and the amount of displacement measured by the displacement sensor, and
   wherein the displacement sensor is an electrostatic capacitance displacement sensor for detecting an electrostatic capacitance between the displacement sensor and the film to be measured to thereby measure a displacement.

5. The film thickness measuring apparatus according to claim 1, wherein the laser beam emitted from the laser displacement sensor penetrates the eddy current coil sensor.

6. The film thickness measuring apparatus according to claim 4, wherein the eddy current coil sensor and the electrostatic capacitance displacement sensor are disposed in a coaxial relation to each other.

7. A film thickness measuring apparatus comprising an eddy current coil sensor, disposing at a predetermined position near a film to be measured, for generating a predetermined eddy current in the film and for detecting a magnetic field caused by the eddy current, a displacement sensor for measuring a displacement between the eddy current coil sensor and the film to be measured, and a movement mechanism for adjusting an amount of a relative displacement between the eddy current coil sensor and the film, wherein a thickness of the film is measured in accordance with a variation in inductance of the eddy current coil sensor and the amount of the displacement measured by the displacement sensor and, wherein the displacement sensor is a laser displacement sensor for emitting a laser beam to the film to be measured to thereby measure a displacement, the laser displacement sensor being mounted above the eddy current coil sensor.

8. The film thickness measuring apparatus according to claim 7, wherein the thickness of the film is measured with a constant relative distance being maintained between the film and the eddy current coil sensor.

9. The film thickness measuring apparatus according to claim 7, wherein a portion of the film to be measured where the eddy current coil sensor generates an eddy current and a portion of the film to be measured where the displacement sensor measures a displacement coincide with each other.

10. The film thickness measuring apparatus comprising an eddy current coil sensor, disposing at a predetermined position near a film to be measured, for generating a predetermined eddy current in the film and for detecting a magnetic field caused by the eddy current, a displacement sensor for measuring a displacement between the eddy current coil sensor and the film to be measured, and a movement mechanism for adjusting an amount of a relative displacement between the eddy current coil sensor and the film, wherein a thickness of the film is measured in accordance with a variation in inductance of the eddy current coil sensor and the amount of the displacement measured by the displacement sensor, and wherein the displacement sensor is an electrostatic capacitance displacement sensor for detecting an electrostatic capacitance between the displacement sensor and the film to be measured to thereby measure a displacement.

11. The film thickness measuring apparatus according to claim 7, wherein the laser beam emitted from the laser displacement sensor penetrates the eddy current coil sensor.

12. The film thickness measuring apparatus according to claim 10, wherein the eddy current coil sensor and the electrostatic capacitance displacement sensor are disposed in a coaxial relation to each other.

* * * * *